United States Patent
Lee et al.

(10) Patent No.: US 7,985,533 B2
(45) Date of Patent: Jul. 26, 2011

(54) BACKLIGHT HAVING ALL-IN-ONE TYPE LIGHT GUIDE PLATE AND METHOD OF MANUFACTURING ALL-IN-ONE TYPE LIGHT GUIDE PLATE

(75) Inventors: Hong-seok Lee, Seongnam-si (KR); Eung-yeoul Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/749,962

(22) Filed: Mar. 30, 2010

(65) Prior Publication Data

US 2010/0181287 A1    Jul. 22, 2010

Related U.S. Application Data

(62) Division of application No. 11/657,476, filed on Jan. 25, 2007, now Pat. No. 7,720,347.

(30) Foreign Application Priority Data

Mar. 28, 2006   (KR) .................. 10-2006-0028028
Jan. 9, 2007    (KR) .................. 10-2007-0002647

(51) Int. Cl.
*B29D 11/00*   (2006.01)
(52) U.S. Cl. ........... 430/321; 216/24; 264/1.24; 264/2.5
(58) Field of Classification Search ......... None
See application file for complete search history.

(56) References Cited

U.S. PATENT DOCUMENTS

| | | |
|---|---|---|
| 4,874,227 A | 10/1989 | Matsukawa et al. |
| 5,396,350 A | 3/1995 | Beeson et al. |
| 5,396,406 A | 3/1995 | Ketchpel |
| 5,428,468 A | 6/1995 | Zimmerman et al. |
| 5,521,725 A | 5/1996 | Beeson et al. |
| 5,555,109 A | 9/1996 | Zimmerman et al. |
| 5,555,329 A | 9/1996 | Kuper et al. |
| 5,598,281 A | 1/1997 | Zimmerman et al. |
| 5,739,931 A | 4/1998 | Zimmerman et al. |
| 5,761,355 A | 6/1998 | Kuper et al. |
| 5,779,337 A | 7/1998 | Saito et al. |
| 5,839,812 A | 11/1998 | Ge et al. |
| 5,839,823 A | 11/1998 | Hou et al. |
| 5,995,690 A | 11/1999 | Kotz et al. |
| 6,049,649 A | 4/2000 | Arai |
| 6,129,439 A | 10/2000 | Hou et al. |
| 6,425,673 B1 | 7/2002 | Suga et al. |

(Continued)

FOREIGN PATENT DOCUMENTS

JP    2004-010739 A  *  1/2004

OTHER PUBLICATIONS

Computer-generated translation of JP 2004-010739 (Jan. 2004).*

*Primary Examiner* — John A. McPherson
(74) *Attorney, Agent, or Firm* — Sughrue Mion, PLLC (57) ABSTRACT

Provided is an all-in-one type light guide plate including a plurality of prism-shaped structures that are integrally formed on the all-in-one light guide plate and which totally internally reflect light incident from a light source and emit the totally internally reflected light.

9 Claims, 5 Drawing Sheets

U.S. PATENT DOCUMENTS

| | | |
|---|---|---|
| 6,425,675 B2 | 7/2002 | Onishi et al. |
| 6,700,716 B2 | 3/2004 | Sejkora |
| 6,816,214 B1 | 11/2004 | Ohsumi |
| 6,844,970 B2 | 1/2005 | Olczak |
| 7,001,060 B1 | 2/2006 | Kimura |
| 7,101,660 B2 | 9/2006 | Cunningham et al. |
| 7,126,653 B2 | 10/2006 | Glaeser et al. |
| 7,160,017 B2 | 1/2007 | Lee et al. |
| 2003/0173690 A1* | 9/2003 | Murata et al. ............... 264/1.34 |
| 2005/0248961 A1 | 11/2005 | Kazuhiro et al. |
| 2005/0270798 A1 | 12/2005 | Lee et al. |
| 2007/0070649 A1 | 3/2007 | Won et al. |

* cited by examiner

BACKLIGHT HAVING ALL-IN-ONE TYPE LIGHT GUIDE PLATE AND METHOD OF MANUFACTURING ALL-IN-ONE TYPE LIGHT GUIDE PLATE

CROSS-REFERENCE TO RELATED PATENT APPLICATIONS

This is a divisional of application Ser. No. 11/657,476 filed Jan. 25, 2007, which claims the benefit of Korean Patent Application Nos. 10-2006-0028028, filed on Mar. 28, 2006, and 10-2007-0002647, filed on Jan. 9, 2007, in the Korean Intellectual Property Office, the disclosures of which are incorporated herein in its entirety by reference.

BACKGROUND OF THE INVENTION

1. Field of the Invention

Apparatuses and methods consistent with the present invention relate to a backlight and a method of manufacturing a light guide plate, and more particularly, to a backlight having an all-in-one type light guide plate and a method of manufacturing the all-in-one type light guide plate.

2. Description of the Related Art

Typically, backlights are used to illuminate flat displays, for example, liquid crystal displays, and are mainly classified as direct light emitting type backlights or light guide plate type backlights depending on the positions of the light sources. Light guide plate type backlights may be also classified as flat type backlights or wedge type backlights.

In direct light emitting type backlights, a light source is installed close below a light exit surface, thereby enabling a surface light emission. Advantageously, direct light emitting type backlights include more light sources in comparison with light guide plate type backlights, thus increasing light brightness and widening the light exit surface. However, in direct light emitting type backlights, power consumption is higher because many light sources are used. Also, it is difficult to realize thin film direct light emitting type backlights because the shape of light sources is reflected, and thus light uniformity is severely reduced.

In light guide plate type backlights, a light guide plate is employed to guide light to a light exit surface. Light sources are disposed on a side surface of the light guide plate. The number of light sources is limited according to a length of a side surface of the light guide plate. Advantageously, thin film light guide plate type backlights can be realized easily. On the other hand, a process for making light brightness uniform on the entire light exit surface is complicated in comparison with direct light emitting type backlights.

Flat type backlights are used in monitors or when high-brightness is required. In flat type backlights, the light sources may be fixed to two or all four edges of the light guide plate. To increase light brightness when a plurality of light sources are used, an edge thickness of the light guide plate should be uniform.

Wedge type backlights are used in devices, such as notebook computers, in which it is difficult to use several light sources due to limited power resources. Only one surface constituting a light incident portion is widened and other surface is narrowed, to thereby reduce the weight of the backlight.

Light sources used in light guide plate type backlights may be line light-sources and point light-sources. A cold cathode fluorescent lamp (CCFL) may be used as a line light-source. In this case, electrodes at both ends of the CCFL are installed within a pipe. A light emitting diode (LED) may be used a point light-source. Advantageously, the CCFL emits strong white light having high-brightness and high-uniformity, and allows design enlargement. However, the CCFL is operated via a high frequency alternating current (AC) signal and at a narrow range of an operation temperature. Meanwhile, the performance of the LED is inferior to that of the CCFL in view of light brightness and uniformity. However, the LED has advantages of operating via a direct current (DC) signal and at a wide range of operation temperatures. In addition, LEDs have long lifespans and can be used to make a thin film direct light emitting type backlight.

Figure 1:
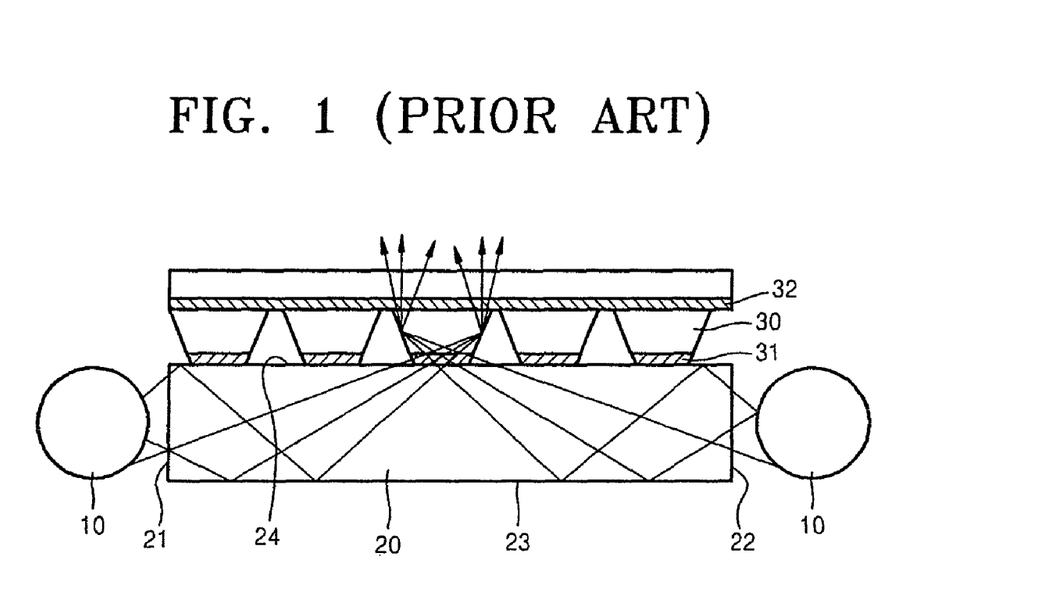
FIG. 1 is a sectional view schematically illustrating a conventional side emitting type backlight.

FIG. 1 is a sectional view schematically illustrating a conventional side emitting type backlight.

Referring to FIG. 1, line light-sources 10 are installed at both sides 21 and 22 of a light guide plate 20. A light path converter 23 is formed on a lower surface of the light guide plate 20 to guide light incident from the line light-sources 10.

A plurality of prisms or prism-shaped structures 30 are formed on an upper side of the light guide plate 20 to diffuse the light coming out from an exit surface 24 into the upper side of the light guide plate 20. The prism-shaped structures 30 are fixed to the upper side of the light guide plate 20 by an adhesive layer 31.

The light incident from the line light-sources 10 into the light guide plate 20 is guided to the exit surface 24 of the light guide plate 20 by the light path converter 23. The light passes through an adhesive layer 31 and diffuses to the upper side of the light guide plate 20 through the prism-shaped structures 30.

Since the prism-shaped structures 30 are fixed to the upper side of the light guide plate 20 by the adhesive layer 31, the light incident into prism-shaped structures 30 must pass through the adhesive layer 31. Thus, the adhesive layer 31 affects the transmission of light. In particular, since the backlight performance depends on an adhering degree of the adhesive force, the adhesive layer 31 should be removed to increase the backlight performance.

SUMMARY OF THE INVENTION

Exemplary embodiments of the present invention provide an all-in-one type light guide plate having improved performance by integrally forming a prism-shaped structure thereon, a backlight having the all-in-one type light guide plate, and a method of manufacturing the all-in-one type light guide plate.

According to an aspect of the present invention, there is provided an all-in-one type light guide plate including a plurality of prism-shaped structures which are integrally formed thereon and which reflect light incident form a light source to be emitted from the light guide plate.

The prism-shaped structures may be formed so that a width of an upper surface through which light is emitted is greater than a width of a lower region thereof.

A plurality of diffusers which diffuse light may be integrally formed on the upper surfaces of the prism-shaped structures.

According to another aspect of the present invention, there is provided a backlight including: a light source; and an all-in-one type light guide plate including a plurality of prism-shaped structures integrally formed thereon, wherein the prism-shaped structures reflect light incident form a light source to be emitted from the light guide plate.

Each of the prism-shaped structures may be formed so that a width of an upper surface through which light is emitted is greater than a width of a lower region thereof.

A plurality of diffusers which diffuse light may be integrally formed on the upper surface of the prism-shaped structures.

According to another aspect of the present invention, there is provided a method of manufacturing an all-in-one type light guide plate including a plurality of prism-shaped structures that are integrally formed on the light guide plate and which reflect light, the method including: forming a sacrificial layer on a substrate; etching the sacrificial layer to form a plurality of prism-shaped structures on the sacrificial layer; forming an all-in-one type light guide plate by coating an elastic material on the sacrificial layer and the prism-shaped structures; and separating the all-in-one type light guide plate from the sacrificial layer.

The etching of the sacrificial layer on the substrate may include regulating a thickness of the sacrificial layer so that a width of an upper, light exit surface of each of the prism-shaped structures is larger than a width of a lower, light entry region of the prism-shaped structures .

The etching of the sacrificial layer may also include partially filing an etched portion of the sacrificial layer with a filler to adjust a thickness of the prism-shaped structures.

The etching of the sacrificial layer may further include positioning a mask having a plurality of through-holes patterned in a predetermined pattern on the sacrificial layer, and irradiating UV light through the through-holes so that the prism-shaped structures formed have oval cross-sections, or have trapezoidal cross-sections.

The method may further include forming a plurality of diffusers on the substrate prior to forming the sacrificial layer on the substrate.

The sacrificial layer may include a hardening material, and the all-in-one type light guide plate may comprise an elastic material.

The sacrificial layer and the all-in-one type light guide plate may each include an elastic material.

The sacrificial layer may include an elastic material, and the all-in-one type light guide plate may comprise a hardening material.

BRIEF DESCRIPTION OF THE DRAWINGS

The above and other aspects and advantages of the present invention will become more apparent by the following detailed description of exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

Figure 2:
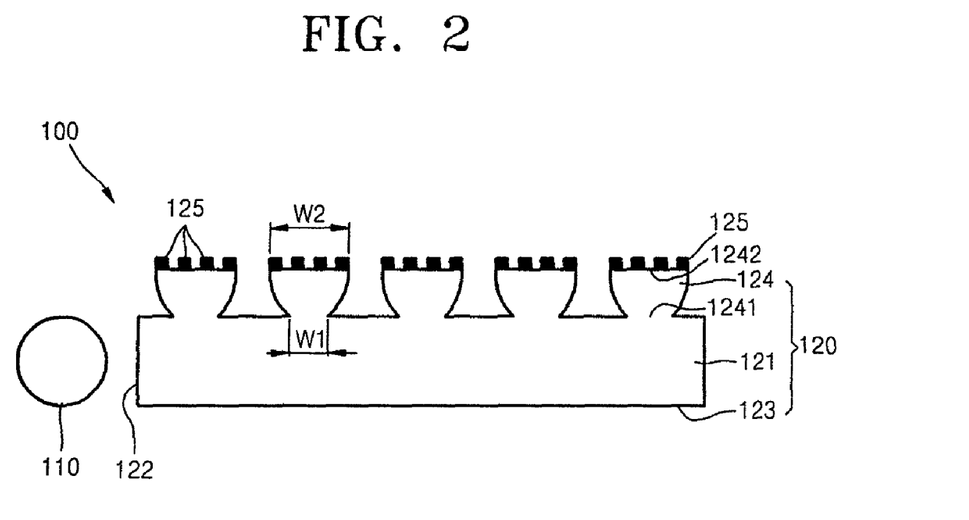
FIG. 2 is a sectional view illustrating a backlight having an all-in-one type light guide plate according to an exemplary embodiment of the present invention.

Referring to FIG. 2, a backlight 100 according to an embodiment of the present invention includes a light source 110 emitting light and an all-in-one type light guide plate 120.

The light source 110 is formed on a side surface 122 of the all-in-one type light guide plate 120, but the present invention is not limited thereto. That is, the light source 110 may be formed on any one of the four surfaces of the all-in-one type light guide plate 120.

The all-in-one type light guide plate 120 includes a light path converter 123 which is formed on a lower surface of a light guide plate 121, and a plurality of prisms or prism-shaped structures 124 which totally reflect light to be emitted upwards, are integrally formed on a upper surface of the light guide plate 121. A longitudinal section of the prism-shaped structures 124 has a partially oval shape. A plurality of diffusers 125, which diffuse the light coming out from the prism-shaped structures 124, are integrally formed on light exit surfaces 1242 of the prism-shaped structures 124. Accordingly, the light emitted from the light source 110 is incident into the light guide plate 121, is directed to the prism-shaped structures 124 by the light path converter 123, passes through the prism-shaped structures 124, and is diffused finely by the diffusers 125.

The prism-shaped structures 124 include lower light entry regions 1241 onto which the light is incident, and upper light exit surfaces 1242. A width W1 of the lower regions 1241 may be smaller than a width W2 of the upper surfaces 1242. A method of forming the prism-shaped structures 124 will be described later.

The light source 110 is formed on one side surface 122 of the light guide plate 121. The light emitted from the light source 110 is incident onto the light guide plate 121 through the one side surface 122 of the light guide plate 121.

Figure 3:
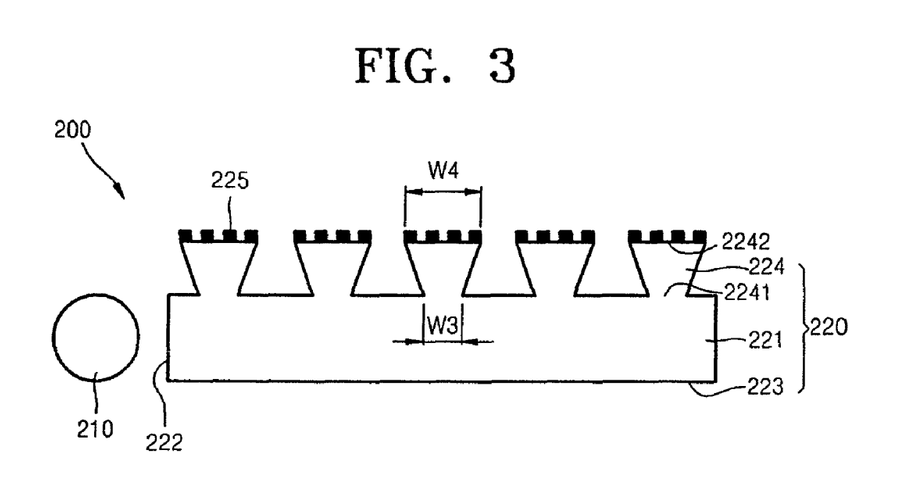
FIG. 3 is a sectional view illustrating a backlight having an all-in-one type light guide plate according to another exemplary embodiment of the present invention.

Referring to FIG. 3, a backlight 200 according to another embodiment of the present invention includes a light source 210 which emits light, and an all-in-one type light guide plate 220.

The light source 210 is formed on one side surface 222 of the all-in-one type light guide plate 220, but a position of the light source 210 in not limited thereto. That is, the light source 210 may be formed on at any one of the four surfaces of the all-in-one type light guide plate 220.

The all-in-one type light guide plate 220 includes a light path converter 223 which is formed on a lower surface of a light guide plate 221, and a plurality of prism-shaped structures 224 which totally reflect light to be emitted upwards, and are integrally formed on a upper surface of the light guide plate 221. The prism-shaped structures 224 may have a trapezoidal longitudinal section, unlike the prism-shaped structures 124 illustrated in FIG. 2. A plurality of diffusers 225, which further diffuse the light coming out from the prism-shaped structures 224, are integrally formed on each upper surface 2242 of the prism-shaped structures 224. Accordingly, when the light source 210 emits light, the light is incident onto the light guide plate 221, is directed to the prism-shaped structures 224 by the light path converter 223, passes through the prism-shaped structures 224, and is diffused finely by the diffusers 225.

The plural prism-shaped structures 224 include lower light entry regions 2241, onto which the light is incident, and upper light exit surfaces 2242. A width (W3) of the lower regions 2241 may be smaller than a width (W4) of the upper surfaces 2242.

A method of forming the all-in-one type light guide plate 120 will now be described with reference to FIGS. 4A through 4F.

Figure 4A:
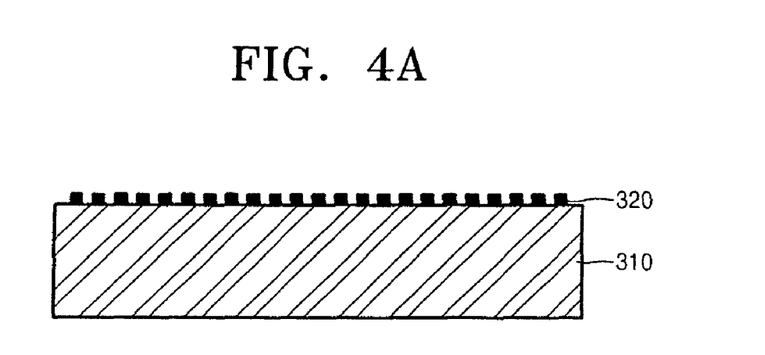
FIGS. 4A through 4F are sectional views for illustrating a method of manufacturing an all-in-one type light guide plate according to an exemplary embodiment of the present invention.

Referring to FIG. 4A, a plurality of diffusers 320 are formed on a substrate 310. The substrate 310 may be formed of $SiO_2$. The plurality of diffusers 320 are formed on the substrate 310 by irradiating UV light to the substrate 310 by a photomask, and developing an exposed portion by a developing solution to form the diffusers 320.

Figure 4B:
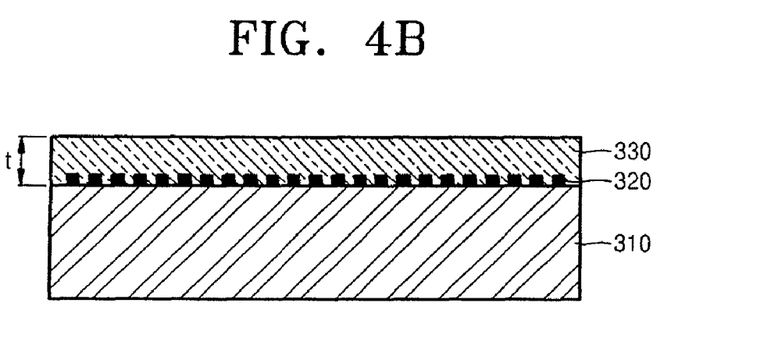

Referring to FIG. 4B, a photoresist having a predetermined thickness is coated on the substrate 310, on which the plurality of diffusers 320 are formed, to form the sacrificial layer 330. Here, because a thickness of the prism-shaped structures 124 depends on a thickness (t) of the sacrificial layer 330, the thickness of the prism-shaped structures 124 can be regulated by adjusting the thickness (t) of the sacrificial layer 330. For example, the thickness of the prism-shaped structures 124 can be increased by increasing the thickness (t) of the sacrificial layer 330, and the thickness of the prism-shaped structures 124 can be decreased by decreasing the thickness (t) of the sacrificial layer 330.

Figure 4C:
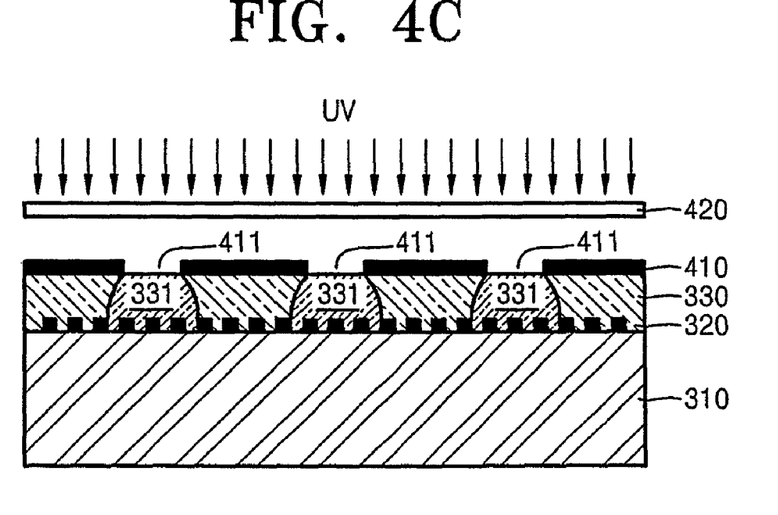

Referring to FIG. 4C, a photomask 410 having a plurality of through-holes 411 formed in a predetermined pattern is positioned on the sacrificial layer 330. Next, UV light is irradiated on the photomask 410. The UV light passes through the plural through-holes 411 and irradiates only some parts of the sacrificial layer 330. Here, a diffusion sheet 420, which is positioned on the photomask 410, diffuses the UV light. The UV light that passes through the plurality of through-holes 411 irradiates a plurality of portions 331. Here, a cross section of the portions 331 is partially oval, as illustrated in FIG. 4C. Without the diffusion sheet 420, the UV light would pass through the through-holes 411 perpendicularly. By using the diffusion sheet 420, the UV passes through the through-holes 411 and is diffused on the portions 331. Thereby, a cross section of the portions 331 is partially oval. Thus, the prism-shaped structures 124 having the lower regions 1241 and the upper surfaces 1242 are formed by irradiating the portion 331 having a partially oval cross section and by regulating the thickness (t) of the sacrificial layer 330. Here, the width (W1) of the lower regions 1241 may be smaller than a width (W2) of the upper surfaces 1242 as illustrated in FIG. 2.

Figure 6:
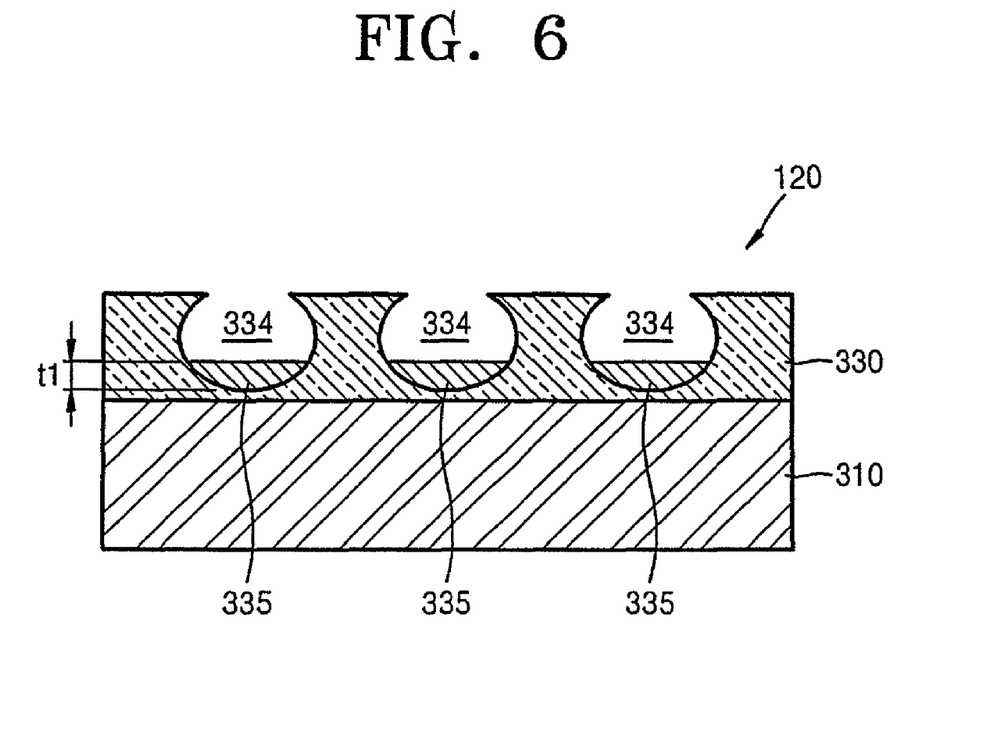
FIG. 6 is a sectional view for illustrating a method of adjusting a thickness of the prism of FIG. 5, according to an exemplary embodiment of the present invention

By increasing the thickness (t) of the sacrificial layer 330 and diffusing the UV light, a portion 334 having a fully oval or circular (not shown) cross section of is formed as illustrated in FIG. 6. Here, the widths W1 and W2 cannot be regulated to have desired values. Accordingly, the sacrificial layer 330 is coated to regulate the thickness (t) of the sacrificial layer 330 and make the width W1 smaller than the width W2.

Figure 4D:
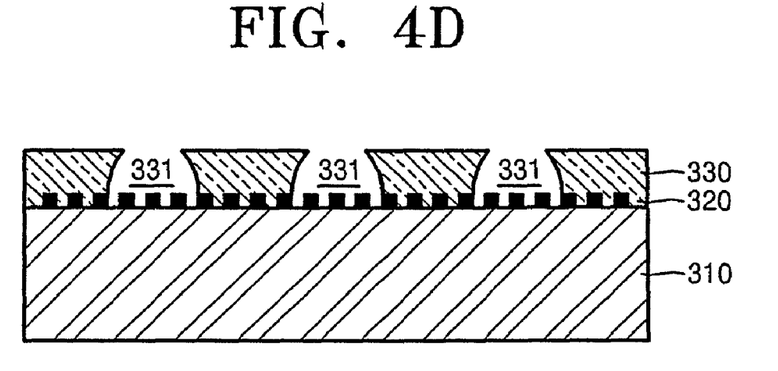

Referring to FIG. 4D, the portions 331 are etched by using a developing solution in order to remove the photoresist therefrom and expose the plurality of diffusers 320.

Figure 4E:
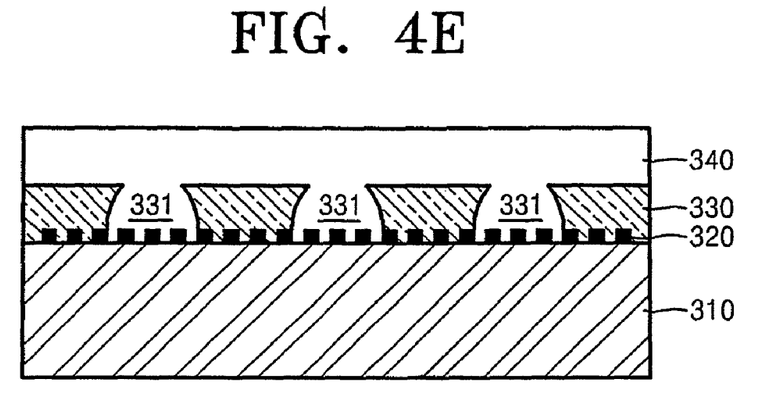

Referring to FIG. 4E, an elastic material 340 is coated and dried on the sacrificial layer 330 and the plurality of diffusers 320. Thus, the elastic material 340 is molded according to the shape of the sacrificial layer 330 and the diffusers 320. Here, the elastic material 340 may be polydimethylsiloxane (PDMS).

Figure 4F:
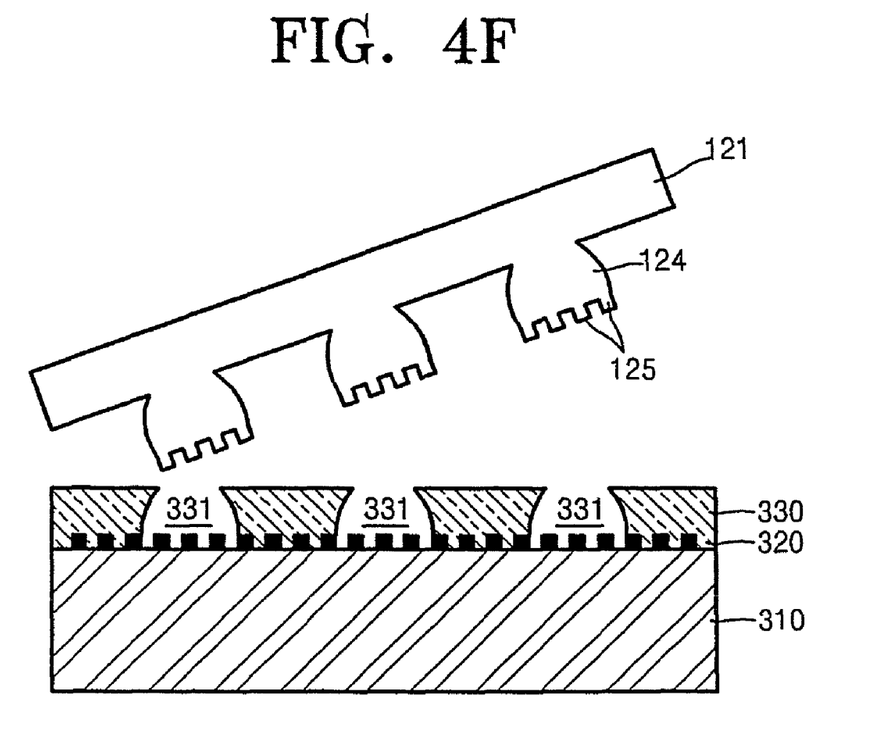

Referring to FIG. 4F, the all-in-one type light guide plate 120, which is molded in an operation of FIG. 4E using the elastic material 340, is separated from the sacrificial layer 330. Here, since the material 340 is elastic, the all-in-one type light guide plate is easily separated from the sacrificial layer 330. The separated all-in-one type light guide plate 120 has a structure in which the plurality of prism-shaped structures 124 are integrally formed on the light guide plate 121 and the plurality of diffusers 125 are integrally formed on the upper surfaces 1242 of the prism-shaped structures 124. After separation, the all-in-one type light guide plate 120 may be a rigid structure.

The sacrificial layer 330 may be formed of an elastic material, and the all-in-one type light guide plate 120 may be also formed for an elastic material. In this way, when the sacrificial layer 330 and the all-in-one type light guide plate 120 are formed of elastic materials, the all-in-one type light guide plate 120 may be much more easily separated from the sacrificial layer 330.

In addition, the sacrificial layer 330 may be formed of an elastic material, by the all-in-one type light guide plate 120 may be formed of an inelastic material (this may be hardened by ultraviolet rays or by heat). Although the material constituting the all-in-one type light guide plate 120 is hardened, since the material constituting the sacrificial layer 330 is elastic, the all-in-one type light guide plate 120 can be separated from the sacrificial layer 330.

The all-in-one type light guide plate 120 can be mass-produced by using the substrate 310 and the sacrificial layer 330, through which the portions 331 are formed, as molds, and by repeating operations of FIGS. 4E and 4F.

Figure 5:
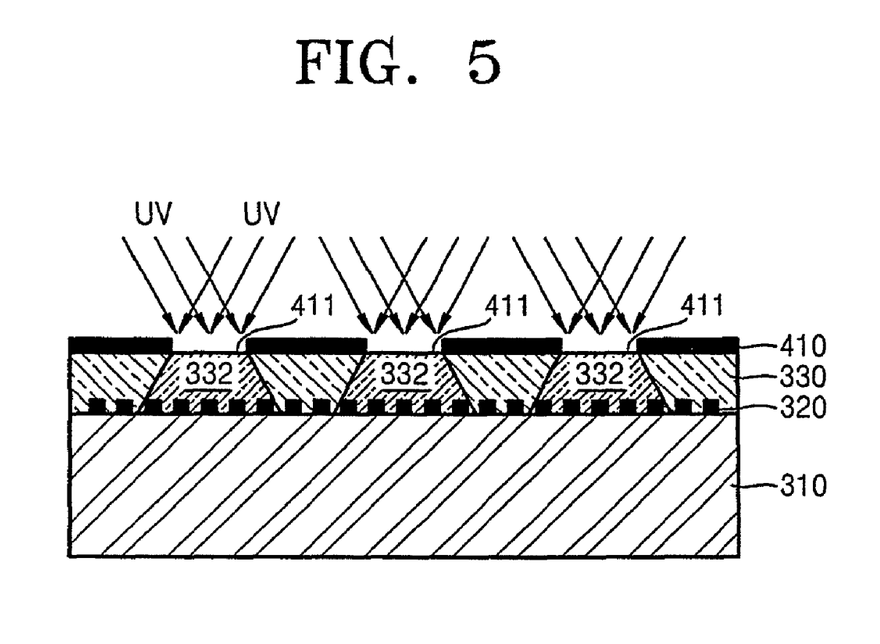
FIG. 5 is a sectional view for illustrating a method of irradiating ultraviolet (UV) light on a sacrificial layer so as to form a prism, according to an exemplary embodiment of the present invention.

Referring to FIG. 5, a method of irradiating UV light for forming the all-in-one type light guide plate 220 is disclosed according to an embodiment of the present invention. UV light is irradiated through a plurality of through-holes 411 of a mask 410 as symmetrically inclined with respect to the mask 410. Although not shown in FIG. 5, the UV light is also irradiated through the through-holes 411 as symmetrically inclined to the front and back with respect to the mask 410, using the same irradiating method as described above. Thus, a cross section of the exposed portion 332 has a trapezoidal longitudinal section. Thus, the prism-shaped structures 224 having the lower regions 2241 and the upper surfaces 2242 are formed. Here, the width (W4) of the upper surface 2242 is wider than the width (W3) of the lower regions 2241 as illustrated in FIG. 3.

In the all-in-one type light guide plate 220, since the UV light is irradiated diagonally on the through-holes 411, the width W4 is always wider than the width W3. Accordingly, the all-in-one type light guide plate 220 may be molded in a desired shape without regulating the thickness of the sacrificial layer 330 unlike for the case of the all-in-one type light guide plate 120.

Referring to FIG. 6, to form the all-in-one type light guide plate 120 without regulating the thickness of the sacrificial layer 330 to adjust the widths W1 and W2, the portions 331 having an oval cross section are formed and then filed with a filler 335, to thus be molded to a desired shape in operation of FIG. 4B.

Here, a thickness t1 of the filler 335 is regulated so that the width W2 may be wider than the width W1.

To form the all-in-one type light guide plate 120 the same method as explained with reference to FIGS. 4A thorough 4F may be used except for the operation of FIG. 6.

The backlight 100 having the all-in-one type light guide plate 120 may have the following advantages.

First, the backlight 120 can be mass-produced by integrally forming the prism-shaped structures 124 on the light guide plate 121.

Second, light properties can be improved since the prism-shaped structures 124 are integrally formed on the light guide plate 121 without a boundary line between the prism-shaped structures 124 and the light guide plate 121.

Third, by regulating the width t of the sacrificial layer 330, the prism-shaped structures 124 can be molded to a desired shape.

Fourth, by forming the diffusers 320 on the light exit surfaces 1242 of the prism-shaped structures 124, light properties can be regulated.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of manufacturing a light guiding device, the method comprising:
   forming a sacrificial layer on a substrate;
   forming a plurality of prism-shaped portions, corresponding in shape to a plurality of prism-shaped structures of the light guiding device, on the sacrificial layer;
   forming the light guiding device by coating a material on the sacrificial layer and the prism-shaped portions; and
   separating the light guiding device from the sacrificial layer,
   wherein a width of a light exit surface of the prism-shaped portions is wider than a width of a light entry region of the prism-shaped portions.

2. The method of claim 1, wherein the forming the plurality of prism-shaped portions comprises regulating a thickness of the sacrificial layer to adjust the shape of each of the prism-shaped portions.

3. The method of claim 1, wherein the forming the prism-shaped portions comprises:
   positioning a mask having a plurality of through-holes patterned in a predetermined pattern on the sacrificial layer, and
   irradiating UV light through the through-holes so that the prism-shaped portions formed on the sacrificial layer have an at least partially oval-shaped cross section.

4. The method of claim 1, wherein forming the plurality of prism-shaped portions comprises:
   positioning a mask having a plurality of through-holes patterned in a predetermined pattern on the sacrificial layer, and
   irradiating UV light inclined and symmetrically through the through-holes so that the prism-shaped portions formed on the sacrificial layer have a trapezoidal shaped cross section.

5. The method of claim 1, further comprising forming a plurality of diffusers on the substrate prior to forming the sacrificial layer on the substrate.

6. The method of claim 1, wherein the light guiding device is made of an elastic material.

7. The method of claim 1, wherein the light guiding device is made of a hardening material.

8. The method of claim 1, wherein the sacrificial layer is made of an elastic material.

9. A method of manufacturing a light guiding device, the method comprising:
   forming a sacrificial layer on a substrate;
   forming a plurality of prism-shaped portions, corresponding in shape to a plurality of prism-shaped structures of the light guiding device, on the sacrificial layer;
   forming the light guiding device by coating a material on the sacrificial layer and the prism-shaped portions; and
   separating the light guiding device from the sacrificial layer,
   wherein the forming the plurality of prism-shaped portions comprises:
      etching the sacrificial layer; and
      partially filling an etched portion of the sacrificial layer with a filler to adjust a thickness of the prism-shaped portions.

* * * * *